United States Patent
Ohba et al.

(10) Patent No.: US 9,710,923 B2
(45) Date of Patent: *Jul. 18, 2017

(54) INFORMATION PROCESSING SYSTEM, INFORMATION PROCESSING DEVICE, IMAGING DEVICE, AND INFORMATION PROCESSING METHOD

(75) Inventors: Akio Ohba, Kanagawa (JP); Hiroyuki Segawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 555 days.

This patent is subject to a terminal disclaimer.

(21) Appl. No.: 14/004,989

(22) PCT Filed: Jan. 16, 2012

(86) PCT No.: PCT/JP2012/000209
§ 371 (c)(1),
(2), (4) Date: Sep. 13, 2013

(87) PCT Pub. No.: WO2012/132167
PCT Pub. Date: Oct. 4, 2012

(65) Prior Publication Data
US 2014/0002616 A1 Jan. 2, 2014

(30) Foreign Application Priority Data
Mar. 31, 2011 (JP) ................ 2011-079990

(51) Int. Cl.
*G06T 7/00* (2017.01)
*G06T 7/20* (2017.01)
(Continued)

(52) U.S. Cl.
CPC ............ *G06T 7/2086* (2013.01); *G06T 7/194* (2017.01); *G06T 7/215* (2017.01); *G06T 7/593* (2017.01);
(Continued)

(58) Field of Classification Search
CPC ..... G06T 7/2086; G06T 7/004; G06T 7/0075; G06T 7/2006; G06T 2207/10021;
(Continued)

(56) References Cited

FOREIGN PATENT DOCUMENTS

CN 101629806 A 1/2010
EP 1806697 A1 7/2007
(Continued)

OTHER PUBLICATIONS

International Search Report for corresponding PCT/2012/000209, dated Mar. 6, 2012.
(Continued)

*Primary Examiner* — Jeremaiah C Hallenbeck-Huber
*Assistant Examiner* — Albert Kir
(74) *Attorney, Agent, or Firm* — Matthew B. Dernier, Esq.

(57) ABSTRACT

An imaging device 12 includes a first camera 22 and a second camera 24. Each of the cameras captures a subject from left and right positions that are apart by a known width at the same timing and frame rate. Each of the captured frame images is converted into image data with a plurality of predetermined resolutions. An input information acquisition section 26 of an information processor 14 acquires an instruction input from the user. A position information generation section 28 roughly estimates, as a target area, a subject area or an area with motion using low-resolution and wide-range images of pieces of stereo image data and performs stereo matching using high-resolution images only for the area, thus identifying the three-dimensional position
(Continued)

of the subject. An output information generation section 32 performs a necessary process based on the position of the subject, thus generating output information. A communication section 30 requests image data to the imaging device 12 and acquires such image data.

14 Claims, 10 Drawing Sheets

(51) Int. Cl.
*G06T 7/70* (2017.01)
*G06T 7/593* (2017.01)
*G06T 7/215* (2017.01)
*G06T 7/194* (2017.01)

(52) U.S. Cl.
CPC ...... *G06T 7/70* (2017.01); *G06T 2207/10021* (2013.01); *G06T 2207/20016* (2013.01)

(58) Field of Classification Search
CPC . G06T 2207/20016; G06T 2207/20144; G06T 7/215; G06T 7/194; G06T 7/70; G06T 7/593; H04N 13/0018; H04N 13/0271; H04N 13/0007; H04N 2013/0081; H04N 13/0239; H04N 2013/0074
USPC ..................................... 348/47, 43; 382/107
See application file for complete search history.

(56) References Cited

FOREIGN PATENT DOCUMENTS

| JP | 2006331266 A | 12/2006 |
|---|---|---|
| JP | 2009294733 A | 12/2009 |
| WO | 2007050885 A2 | 5/2007 |

OTHER PUBLICATIONS

European Search Report for corresponding 12764920.0, dated Feb. 27, 2015.
Kazunori Umeda et al: "Subtraction stereo: a stereo camera system that focuses on moving regions". Proceedings of SPIE. vol. 7239. pp. 1-11, Jan. 18, 2009.
Office Action for corresponding CN Application No. 201280014505.2, 10 pages, dated Oct. 12, 2015.
International Preliminary Report on Patentability and Written Opinion for corresponding PCT/2012/000209, dated Oct. 10, 2013.

INFORMATION PROCESSING SYSTEM, INFORMATION PROCESSING DEVICE, IMAGING DEVICE, AND INFORMATION PROCESSING METHOD

CROSS REFERENCE TO RELATED APPLICATIONS

This application claims priority to International Application No. PCT/JP2012/000209, filed Jan, 16, 2012, which claims priority to Japanese Application No. JP2011-079990, filed Mar. 31, 2011, the entire disclosures of which are hereby incorporated by reference.

TECHNICAL FIELD

The present invention relates to an information processing system for performing processes to suit the motion of a subject whose movie is being captured, an information processor and an imaging device included in the system, and an information processing method used in the system.

BACKGROUND ART

Recent years have seen widespread proliferation of capturing user's figure with a camera-equipped personal computer and gaming machine for a variety of applications. Among examples of such applications commercially available now are transmission of user images to the other party in an "as-is" manner such as TV phone and video chat and recognition of user motion through image analysis for use as input information for a game or information processing (refer, for example, to Patent Literature 1).

CITATION LIST

Patent Literature

[PTL 1] WO 2007/050885 A2

SUMMARY

Technical Problem

Implementing a variety of processes with excellent responsiveness and high accuracy using captured images requires an image quality suitable for the nature of the process. However, it is difficult, from the viewpoint of manufacturing cost, image transmission band, responsiveness from image capture to image output and so on, to reinforce the functionalities of the information processor by upgrading the performance and image quality of the camera alone. For example, the higher the imaging element of the camera is upgraded, the more cluttered the image data transmission band between the camera and host becomes, and the more time it takes to analyze the image.

The present invention has been devised in light of the above problem, and it is an object of the present invention to provide a technology for implementing information processing using captured images with excellent responsiveness.

Solution to Problem

A mode of the present invention relates to an information processor. The information processor outputs, at a predetermined rate, position information of a subject by performing stereo matching using a stereo movie obtained by filming a video of the subject from different viewpoints at the same time. The information processor is characterized by including: a motion area identification part adapted to acquire image data representing an image frame pair, included in the stereo movie, at a predetermined resolution and identify a motion area by finding the difference in motion; a target area determination unit adapted to determine a target area subject to stereo matching based on the motion area; a resolution determination part adapted to determine an appropriate resolution for stereo matching in accordance with the size of the target area; and a position information acquisition unit adapted to acquire the image data representing the target area of the image frame pair, included in the stereo movie, at the appropriate resolution, perform stereo matching using the image data, acquire position information of the subject and output the position information.

Another mode of the present invention relates to an imaging device. The imaging device is characterized by including a pair of cameras adapted to film a video of a subject from different viewpoints at the same time, wherein each of the cameras includes an image acquisition section adapted to acquire an unprocessed image captured using an imaging element, a demosaicing section adapted to perform a de-mosaic process on the unprocessed image, a filter section adapted to gradually downsize the demosaiced image so as to convert it into a plurality of images having different resolutions, and an image transmission section adapted to receive, from a connected information processor, an image data transfer request specifying a resolution and area, extract image data whose resolution and area match those given in the transfer request from the plurality of images having different resolutions, and transfer the data to the information processor.

Still another mode of the present invention relates to an information processing system. The information processing system is characterized by including: an imaging device including a pair of cameras adapted to film a video of a subject from different viewpoints at the same time; and an information processor adapted to output, at a predetermined rate, position information of a subject by performing stereo matching using a stereo movie obtained by image capture of the imaging device. Each of the cameras of the imaging device includes an image acquisition section adapted to acquire an unprocessed image captured using an imaging element, a demosaicing section adapted to perform a de-mosaic process on the unprocessed image, a filter section adapted to gradually downsize the demosaiced image so as to convert it into a plurality of images having different resolutions, and an image transmission section adapted to receive, from the information processor, an image data transfer request specifying a resolution and area, extract image data whose resolution and area match those given in the transfer request, and transfer the data to the information processor. The information processor includes a motion area identification part adapted to acquire image data representing an image frame pair, included in the stereo movie, at a predetermined resolution from the imaging device and identify a motion area by finding the difference in motion, a target area determination unit adapted to determine a target area subject to stereo matching based on the motion area, a resolution determination part adapted to determine an appropriate resolution for stereo matching in accordance with the size of the target area, and a position information acquisition unit adapted to acquire the image data representing the target area of the image frame pair, included in the stereo movie, at the appropriate resolution from the imaging device, perform stereo matching using the image data, acquire position information of the subject and output the position information.

Still another mode of the present invention relates to an information processing method. The information processing method outputs, at a predetermined rate, position information of a subject and storing it in a memory by performing stereo matching using a stereo movie obtained by filming a video of the subject from different viewpoints at the same time, the information processing method being characterized by including: a step of acquiring image data representing an image frame pair, included in the stereo movie, at a predetermined resolution from an imaging device and identifying a motion area by finding the difference in motion; a step of determining a target area subject to stereo matching based on the motion area; a step of determining an appropriate resolution for stereo matching in accordance with the size of the target area; and a step of acquiring the image data representing the target area of the image frame pair, included in the stereo movie, at the appropriate resolution from the imaging device, performing stereo matching using the image data, acquiring position information of the subject and outputting the position information to the memory.

It should be noted that any combinations of the above components and any conversions of expressions of the present invention between "method," "device," "system," "computer program," "recording media storing a computer program" and so on are also effective as modes of the present invention.

Advantageous Effect of Invention

The present invention permits information processing using captured images as input information with excellent responsiveness.

DESCRIPTION OF EMBODIMENT

Figure 1:
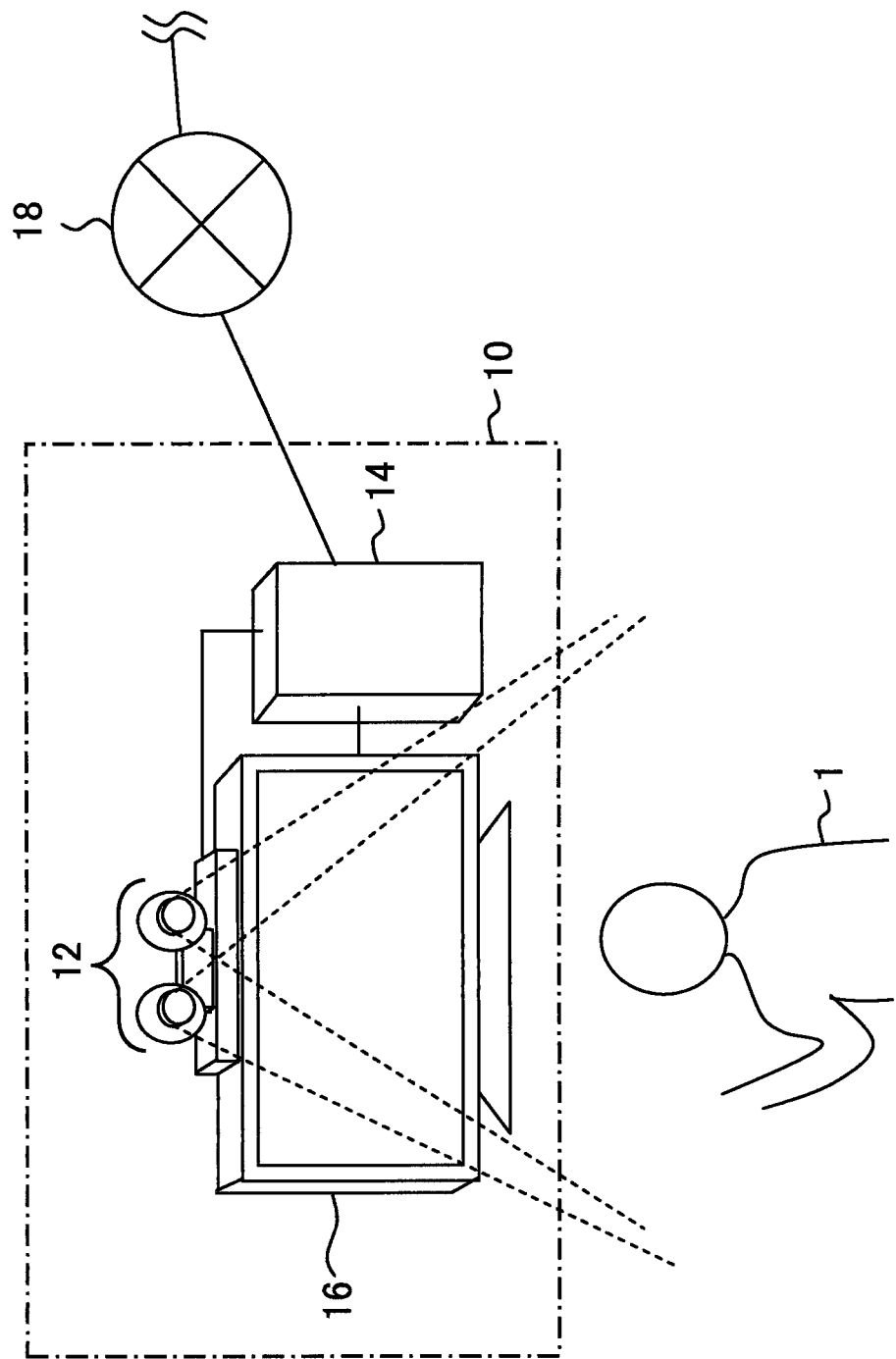
FIG. 1 is a diagram illustrating a configuration example of an information processing system to which a present embodiment is applicable.

FIG. 1 is a diagram illustrating a configuration example of an information processing system to which a present embodiment is applicable. An information processing system 10 includes an imaging device 12 which incorporates two cameras adapted to capture a subject such as a user 1, information processor 14 which performs information processing in response to a user request based on the captured image, and display device 16 which outputs image data obtained as a result of processing performed by the information processor 14. Further, the information processor 14 is connectable to a network 18 such as the Internet.

The information processor 14 may be connected to the imaging device 12, display device 16 and network 18 via a cable. Alternatively, the information processor 14 may be connected wirelessly by a wireless LAN (Local Area Network). Two of the imaging device 12, information processor 14 and display device 16 or all thereof may be combined into a single device. Alternatively, the imaging device 12 need not necessarily be installed on top of the display device 16. Still alternatively, the number of users need not necessarily be one, and is not limited.

The imaging device 12 has two digital video cameras, one on the left and another on the right and spaced apart with a known clearance therebetween. Each of the cameras has an imaging element such as CCD (Charge Coupled Device) or CMOS (Complementary Metal Oxide Semiconductor). Each of the two digital video cameras captures a subject existing in the same space from a left or right position at a predetermined frame rate. A frame pair captured in this manner will be hereinafter referred to as a stereo image. The imaging device 12 further generates a plurality of pieces of image data having different resolutions from a pair of RAW images obtained as a result of capture.

The information processor 14 identifies the position coordinates of the subject in a three-dimensional space made up of height, width and depth for the field of view of the camera at a predetermined rate. At this time, the information processor 14 performs stereo matching based on the stereo image data obtained from the imaging device 12. The change in position coordinates over time obtained in this manner will be used for the subsequent process using the motion of a subject as input information, for example, for a game featuring a character whose motion reflects the motion of the user 1 as a subject or for information processing adapted to convert the motion of the user 1 into a command input. However, the nature of application is not limited.

The display device 16 displays the result of the process performed by the information processor 14 as an image as necessary. The display device 16 may be a display adapted to output images and a television set which includes a speaker adapted to output sounds and is, for example, a liquid crystal television set, plasma television set or a PC display. Because the nature of the process eventually performed by the information processor 14 and the image to be displayed are not specifically limited by the purpose of application as described above, a description will be given below with emphasis on specific processing of the subject's position performed by the information processor 14.

Figure 2:
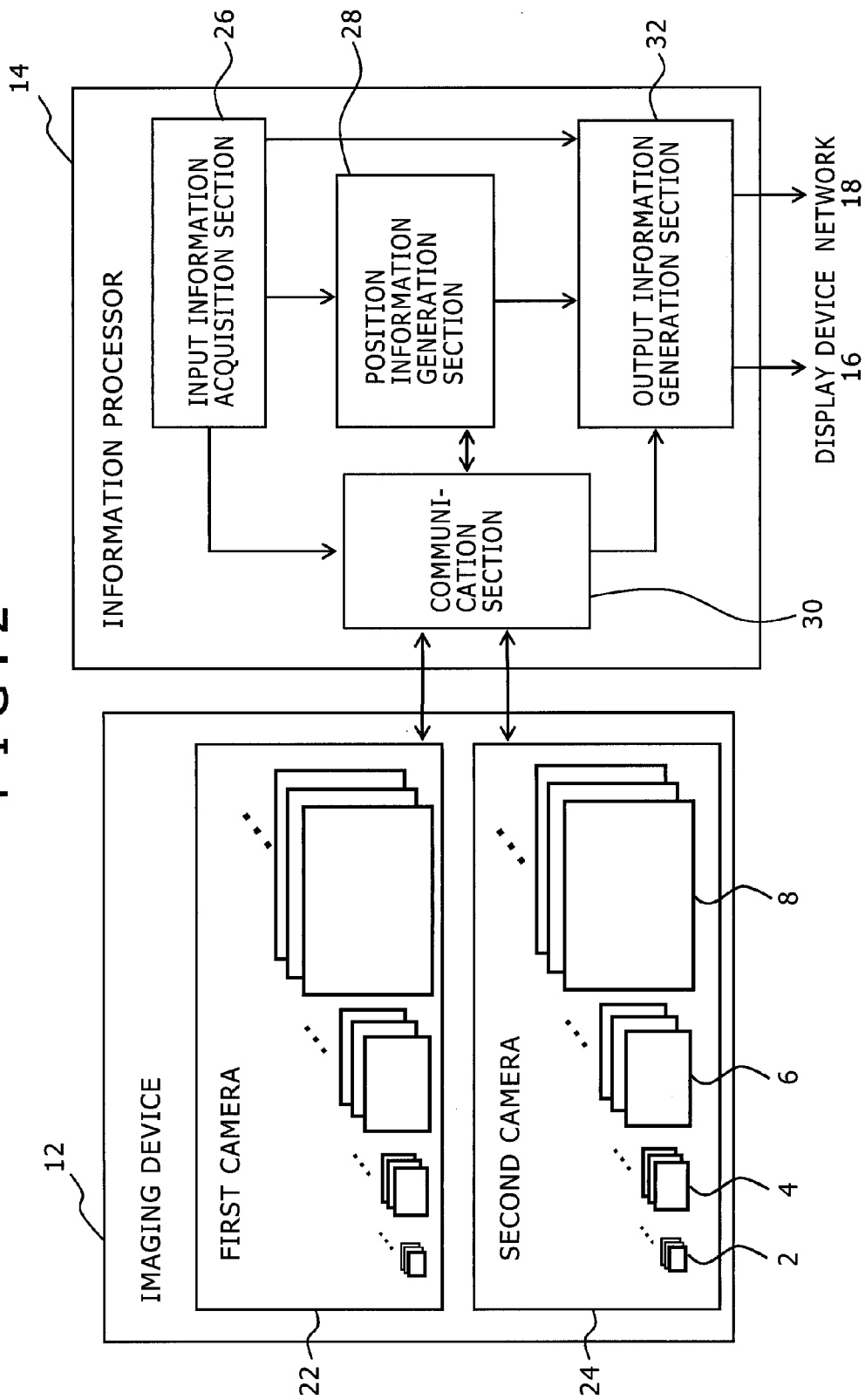
FIG. 2 is a diagram illustrating the configurations of an imaging device and information processor in the present embodiment.

FIG. 2 illustrates the configurations of the imaging device 12 and information processor 14. Each of the functional blocks shown in FIGS. 2 to 5 can be implemented by a CPU (Central Processing Unit), RAM (Random Access Memory), ROM (Read Only Memory), drawing circuit and so on in terms of hardware, and by a program that delivers data input, data holding, image analysis, drawing and other functions in terms of software. Therefore, it is to be understood by those skilled in the art that these functional blocks can be implemented by hardware alone, software alone or a combination thereof and are not limited to any one of them.

The imaging device 12 includes first and second cameras 22 and 24. Each of the cameras captures a subject from left and right positions that are apart by a known width at the same timing and frame rate. Each of the captured frame images is converted into image data having a plurality of predetermined resolutions. The same drawing schematically illustrates the images generated in this manner. In the second camera, images 2, 4, 6 and 8 increase in resolution in a step-by-step manner. Although there are four steps of resolutions in the same drawing, the number of resolutions is not limited. The same holds true for the images generated by the first camera 22.

Each of the images is generated at each capture timing, thus, as a result, generating an image string having one of the resolutions relative to the time axis. The same drawing schematically illustrates the time axis in the depth direction. Images generated at the same time can be considered to make up a hierarchy structure having hierarchy levels, each associated with one of the different resolutions. In the description given below, these images will be referred to as images at the zeroth, first, second, and other levels in ascending order from the image at the lowest resolution hierarchy level. In the example shown in FIG. 2, the images 2 are images at the zeroth hierarchy level, the images 4 are images at the first hierarchy level, the images 6 are images at the second hierarchy level, and the images 8 are images at the third hierarchy level.

The information processor 14 includes an input information acquisition section 26 which acquires an instruction input from the user, position information generation section 28 which generates position information of a subject such as the user 1 based on a captured image, output information generation section 32 which performs a necessary process based on the position of the subject, thus generating output information, and communication section 30 which is an interface adapted to request image data to the imaging device 12 and acquire such image data.

The input information acquisition section 26 receives an instruction input from the user, transmitting a processing request signal responsive thereto to other functional blocks. The input information acquisition section 26 is implemented by coordinated operation of an ordinary input device such as button, keyboard, mouse, trackball or touch panel and a CPU or other adapted to interpret the nature of operation performed on the input device and generate a processing request signal.

The position information generation section 28 performs stereo matching using the stereo image data generated by the first and second cameras 22 and 24, thus identifying the three-dimensional position of the subject. At this time, the position information generation section 28 selects image data to be processed timewisely and spatially to reduce it to a minimum necessary level, thus minimizing the impact on accuracy and alleviating processing load.

More specifically, the position information generation section 28 roughly estimates, as a target area, a subject area or an area with motion using low-resolution and wide-range images and performs stereo matching using high-resolution images only for the area. In stereo matching, a search is generally made to find corresponding points between two images. Narrowing this search area provides improved efficiency in stereo matching. It should be noted that because the present embodiment implements information processing using a movie as input information, a description will be given primarily of the method of acquiring position information of a portion with "motion" of the subject.

At this time, the process adapted to estimate an area with motion of the subject through prediction of the area until a predetermined period of time elapses is performed at a separate timing from stereo matching. For example, if the information processor 14 is implemented by a computer that supports multithreading, these two are carried out independently of each other. This makes it possible to spend much time in stereo matching process that requires accuracy. For example, while all frames of captured images are subject to the stereo matching process, the area estimation process is performed every several frames whose number is predetermined so that prediction is performed for each frame until a next area estimation process is performed.

Further, the area estimation process also includes the selection of an appropriate hierarchy level for stereo matching. The more forward the subject, the larger the parallax. Therefore, the deviation width between the left and right images is large even in an image with a relatively low resolution, thus making it easy to maintain the accuracy of stereo matching. Conversely, the more rearward the subject, the smaller the parallax. Therefore, the deviation width between the left and right images remains within the tolerance in an image with a low resolution, thus making it difficult to maintain the accuracy of stereo matching.

For this reason, in the present embodiment, the hierarchy level of the image used for stereo matching is selected according to the size of the area with motion. Even if an image having high resolution is used, the area to be searched to find corresponding points is local as described above. As a result, the size of the image to be processed is the same irrespective of the position of the subject in the depth direction. Therefore, the amount of calculations does not change much, thus making it easy to estimate the amount of time required for calculations.

The position information generation section 28 further generates depth images in which the position coordinates of the subject in the depth direction obtained by stereo matching are represented as pixel values on an image plane made up of the vertical and horizontal directions. These depth images have a hierarchy structure represented by the same plurality of resolutions as for the hierarchy structure of the captured images generated by the cameras. As described above, a spatial resolution exists which is necessary to recognize a motion of the subject as such depending on the position in the depth direction. That is, there is a case in which the accuracy is higher by ignoring such a motion depending on the spatial resolution required of the process performed by the output information generation section 32 provided at the subsequent stage. Therefore, the efficiency and accuracy of the process are improved by organizing the depth images into a hierarchy structure and changing the hierarchy levels to be referenced according to the resolution required of the process at the subsequent stage.

The output information generation section 32 acquires the position information generated by the position information generation section 28, performing a process suitable for the purpose of application. Although the process performed here is not limited as described above, the output information generation section 32 may change the process as appropriate according to the user instruction received by the input information acquisition section 26. At this time, the output information generation section 32 references the depth images at the hierarchy level associated with the predetermined resolution, acquiring only the motion meaningful for the process to be performed as described above. The data obtained as a result of the process is displayed on the display device 16 or transmitted to other device via the network 18.

Depending on the purpose of application, the output information generation section 32 may manipulate the image captured by either of the cameras of the imaging device 12 based on the position information generated by the position information generation section 28 before displaying the image on the display device 16. For example, the output information generation section 32 can acquire the captured image of the motion of the hand of the user 1 or the controller held in his or her hand from the position information generation section 28 and manipulate all frames of the image in such a manner as to superimpose an image of a sword on the appropriate position of the captured image, thus representing the user wielding the sword.

In this case, the position information generation section 28 may acquire one of the frames of each of the stereo images used for stereo matching at the same time, manipulate each frame and output it to the display device 16. Alternatively, the position information generation section 28 may acquire image data of each of the frames captured by one of the cameras independently of stereo matching and manipulate the data. The rate at which stereo matching is performed, that at which the target area estimation process is performed, and the frame rate used to generate an output image, may be determined independently of each other.

Although the more rapid the rate at which each of the processes is performed, the more elaborately the process can be performed in terms of time resolution. However, this results in increased communication band and increased processing load. Therefore, the rates may be selected according to the original performance of the information processing system 10 and the presence or absence of a concurrently performed process. A table associating available communication bands and processing resources with the rates may be prepared in advance so as to determine the rates in accordance with the actual processing environment by referencing the table.

The communication section 30 acquires, of the images having a hierarchy structure generated by the first and second cameras 22 and 24, information about the hierarchy level and area necessary for the process performed by the information processor 14 from the input information acquisition section 26 and position information generation section 28, making a request to the imaging device 12. The communication section 30 supplies, as appropriate, the image data transmitted from the imaging device 12 in response to the request, to the position information generation section 28 and output information generation section 32.

Figure 3:
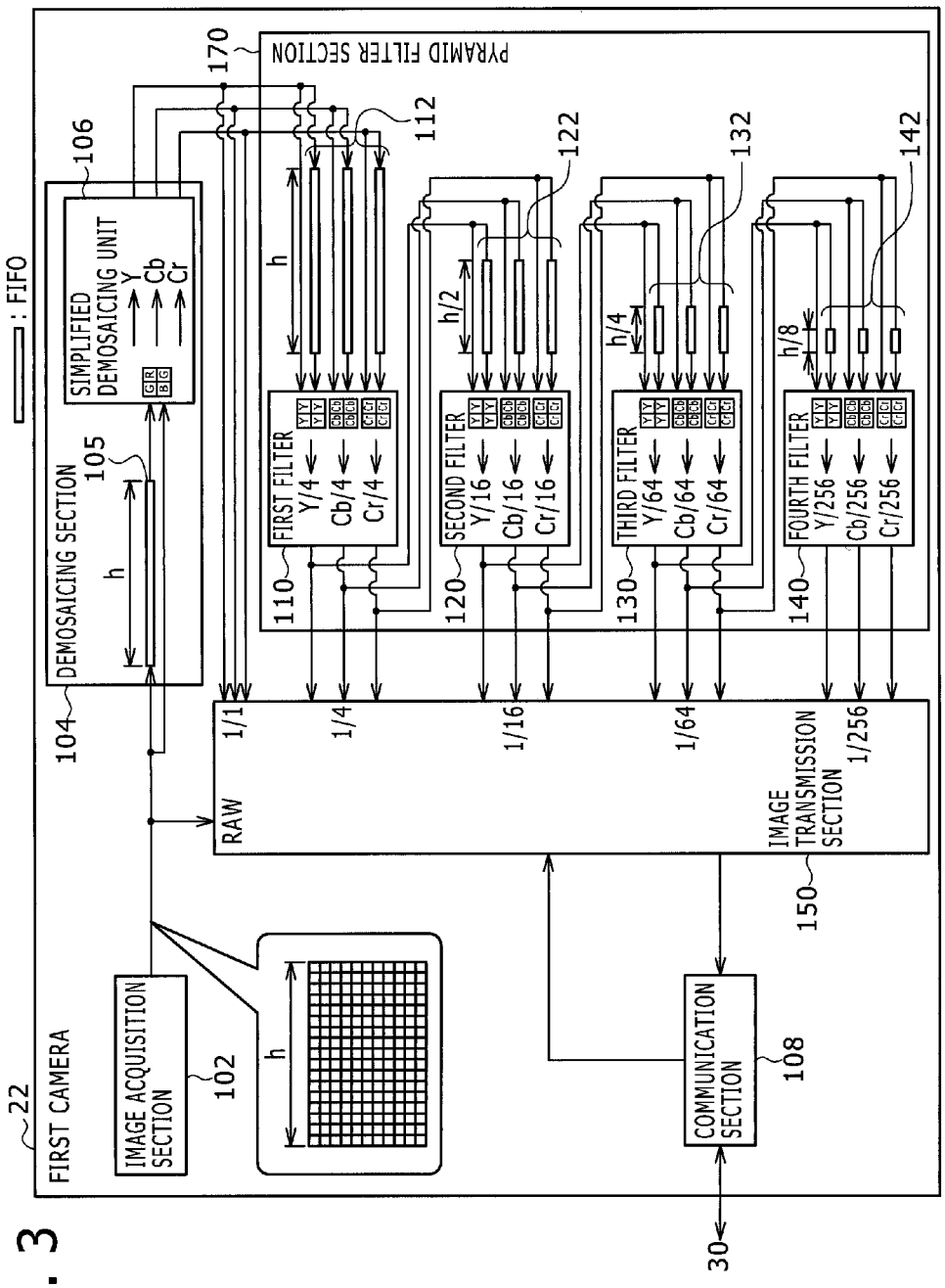
FIG. 3 is a diagram illustrating in detail the configuration of a first camera in the present embodiment.

FIG. 3 illustrates in detail the configuration of the first camera 22. It should be noted that the second camera 24 has the same configuration. The first camera 22 includes an image acquisition section 102, demosaicing section 104, image transmission section 150, pyramid filter section 170 and communication section 108. The image acquisition section 102 reads an image exposed by an imaging element such as CCD or CMOS at predetermined timings (e.g., 60 times/second). In the description given below, we assume that this image has "h" pixels worth of lateral width. This image is a so-called RAW image. The image acquisition section 102 transmits the RAW image to the demosaicing section 104 and image transmission section 150 every time the exposure of a row of pixels of the RAW image is complete.

The demosaicing section 104 has a FIFO (First In First Out) buffer 105 having "h" pixels of storage capacity and a simplified demosaicing unit 106. The FIFO buffer 105 is supplied with pixel information about a row of pixels of the RAW image and retains the information until the demosaicing section 104 is supplied with a next row of pixels. When receiving two rows of pixels, the simplified demosaicing unit 106 uses these pixels to perform the de-mosaic process adapted to complement color information of each of the pixels based on the surrounding pixels and create a full-color image.

As is known to those skilled in the art, various approaches of this de-mosaic process are available. Here, however, a simplified de-mosaic process using only two rows of pixels is sufficient. As an example, if a pixel whose associated YCbCr values are to be calculated has only a G value, RGB values of the pixel are calculated by averaging the adjacent R values on the right and left for the R value, using the G value in an as-is manner for the G value, and using the B value above or below for the B value, followed by substituting the RGB values into a predetermined conversion formula for calculation of the YCbCr values. Such a de-mosaic process is well known, and a further detailed description thereof will be omitted.

As a modification example of a simplified de-mosaic process, YCbCr values of one pixel may be generated from four RGB pixels. In this case, a demosaiced image a quarter size of a RAW image is obtained. Therefore, a first filter 110 which will be described later is unnecessary. The simplified demosaicing unit 106 converts four RGB pixels, two down and two across, into YCbCr color signals, for example, as illustrated in the drawing. Then, this block made up of four pixels is not only delivered to the image transmission section 150 as a 1/1 demosaiced image but also sent to the pyramid filter section 170.

The pyramid filter section 170 has a functionality to hierarchically organize a certain image into a plurality of resolutions and output the resultant image. The pyramid filter generally has as many 1/4 downsizing filters as appropriate for the required level of resolution. In the present embodiment, the pyramid filter section 170 has four hierarchy levels of filters, namely, first to fourth filters 110 to 140. Each of the filters bilinearly interpolates the four pixels adjacent to each other, thus calculating a mean pixel value of the four pixels. Therefore, the processed image size is a quarter of the original size.

An h-pixel-wide FIFO buffer 112 is arranged for each of the Y, Cb and Cr signals at the previous stage of the first filter 110. These FIFO buffers 112 retain a row of YCbCr pixels until a next row of pixels is output from the simplified demosaicing unit 106. The amount of time during which the pixels are retained is determined by the line scan rate of the imaging element.

When supplied with two rows of pixels, the first filter 110 averages the Y, Cb and Cr pixel values of the four pixels, two down and two across. As this process is repeated, the 1/1 demosaiced image is reduced to half in height and width and converted to a quarter of the original size as a whole. The converted quarter-sized demosaiced image is not only sent to the image transmission section 150 but also delivered to the second filter 120 at the next stage.

A 2/h-pixel-wide FIFO buffer 122 is arranged for each of the Y, Cb and Cr signals at the previous stage of the second filter 120. These FIFO buffers 114 retain a row of YCbCr pixels until a next row of pixels is output from the first filter 110.

When supplied with two rows of pixels, the second filter 120 averages the Y, Cb and Cr pixel values of the four pixels, two down and two across. As this process is repeated, the quarter-sized demosaiced image is reduced to half in height and width and converted to a 1/16 of the original size as a whole. The converted 1/16-sized demosaiced image is not only sent to the image transmission section 150 but also delivered to the third filter 130 at the next stage.

Each of the third and fourth filters 130 and 140 repeats the same process as described above except that an h/4-pixel-wide FIFO buffer 132 or h/8-pixel-wide FIFO buffer 142 is arranged at the previous stage thereof. Then, the third and fourth filters 130 and 140 output 1/64- and 1/256-sized demosaiced images to the image transmission section 150, respectively. It should be noted that a pyramid filter as described above is well known as shown by the fact that it is described, for example, in the specification of European Published Patent No. 0999518. Therefore, a further detailed description thereof will be omitted.

As described above, the image transmission section 150 is supplied with images, each reduced to a quarter size of the original image, from each of the filters of the pyramid filter section 170. As is clear from this, the more filters of the pyramid filter section 170 data passes through, the smaller the size of the FIFO buffer required at the previous stage of each filter.

The image transmission section 150 selects, of the hierarchy images made up of the RAW image received from the image acquisition section 102, 1/1 demosaiced image received from the demosaicing section 104, and quarter- to 1/256-sized demosaiced images received from the pyramid filter section 170, a necessary hierarchy level and area according to the instruction received from the communication section 30 of the information processor 14 via the communication section 108. Then, the image transmission section 150 generates a packet with these images and transmits the packet to the communication section 108.

The communication section 108 transmits the packet to the information processor 14 according to a predetermined protocol such as USB1.0/2.0. The communication section 108 may communicate with the information processor 14 not only in a wired manner but also through wireless LAN communication such as IEEE802.11a/b/g and through infrared communication such as IrDA.

Figure 4:
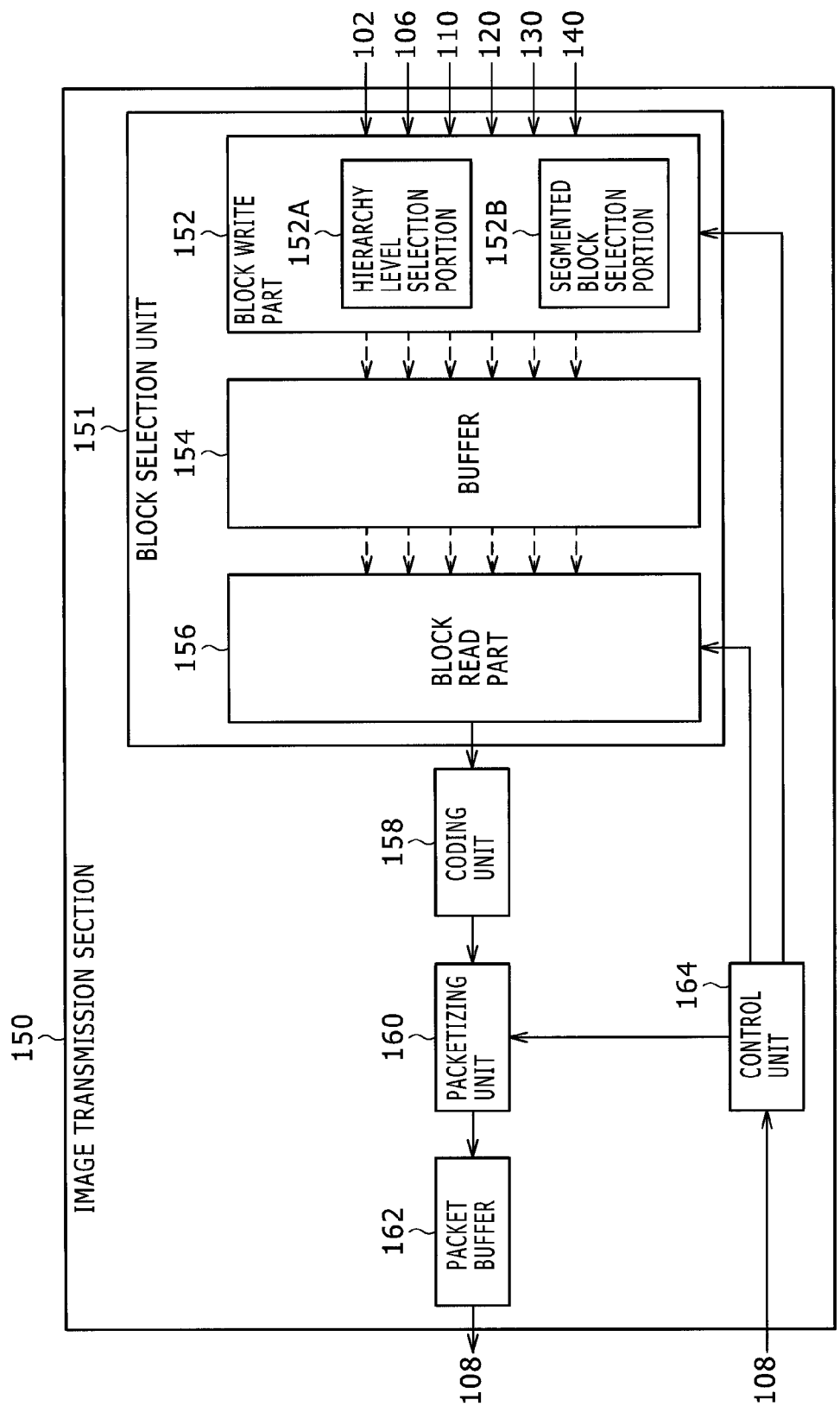
FIG. 4 is a diagram illustrating the configuration of an image transmission section in the present embodiment.

FIG. 4 illustrates the configuration of the image transmission section 150. The image transmission section 150 has a block write part 152, buffer 154, block read part 156, coding unit 158, packetizing unit 160, packet buffer 162 and control unit 164. The control unit 164 instructs the block write part 152 and block read part 156 which of different pieces of image data to transmit in a packet based on the instruction from the information processor 14.

The block write part 152 is supplied with 1/1- to 1/256-sized demosaiced images by way of the demosaicing section 104 and pyramid filter section 170. Further, depending on the nature of process performed by the output information generation section 32 of the information processor 14, the block write part 152 is supplied with a RAW image from the image acquisition section 102. A hierarchy level selection portion 152A of the block write part 152 selects one of the hierarchy levels of the demosaiced images based on the instruction from the control unit 164.

A segmented block selection portion 152B receives position information of the area necessary for the process from the information processor 14, selecting, as a specific block, a block containing an area larger by the predetermined number of pixels than that area. It should be noted that the size of a block should preferably be eight by eight pixels to suit JPEG coding at the subsequent stage. The segmented block selection portion 152B segments only a partial block from the selected demosaiced image, writing the block to the buffer 154.

At this time, the segmented block selection portion 152B receives an image for each two by two pixels and sequentially writes the image to the buffer 154. The block read part 156 reads the image blocks in the order in which one block's worth of pixels are ready on the buffer 154, transferring the blocks to the coding unit 158. The block write part 152 and block read part 156 have been adjusted by the control unit 164 to operate in synchronism with each other. That is, the read and write are performed by the block write part 152 every time pixels are output from the image acquisition section 102, demosaicing section 104 and pyramid filter section 170. In contrast, the read is performed by the block read part 156 every time a block's worth of pixels are accumulated in the buffer 154. This synchronization timing is determined by the camera exposure speed.

In the present embodiment, pixels are transmitted to the information processor 14 on a block-by-block basis rather than transmitting pixels after the entire RAW image's or entire downsized image's worth of pixels are available. Therefore, it is sufficient for the buffer 154 to be sized to store at maximum all the image blocks of the RAW image or downsized image. Depending on the purpose of application of the image, it is only necessary to store two or three image blocks. Thus, the amount of buffered data is small, and every time a block is available, it is packetized and transmitted. This contributes to reduced latency in the processing performed by the imaging device 12.

Further, pixels are output to the block write part 152 from the image acquisition section 102. Pixels are also output to the block write part 152 from the pyramid filter section 170 every time the exposure by the imaging element is complete. Therefore, there is absolutely no likelihood in terms of the structure that blocks of different frames will be written to the buffer 154 or that blocks will be packetized in a different order and transmitted.

The coding unit 158 performs known compression coding such as JPEG on blocks of images other than the RAW image, transmitting the blocks to the packetizing unit 160. The packetizing unit 160 packetizes the coded image blocks in the order in which they arrive at the packetizing unit 160, writing the blocks to the packet buffer 162. The communication section 108 transfers the packets from the packet buffer 162 to the information processor 14 according to a predetermined communication protocol. It should be noted that the images other than the RAW image may also be not compression coded by the coding unit 158, and that the packetizing unit 160 may directly packetize the blocks acquired from the block read part 156.

It should be noted that although other known coding schemes such as LLVC and AVC can also be used, a coding scheme that can code data on a block-by-block basis is preferred. Further, the size of blocks read by the block read part 156 can also be changed in response to the coding. For example, 256-by-256-pixel blocks may be read and coded.

Figure 5:
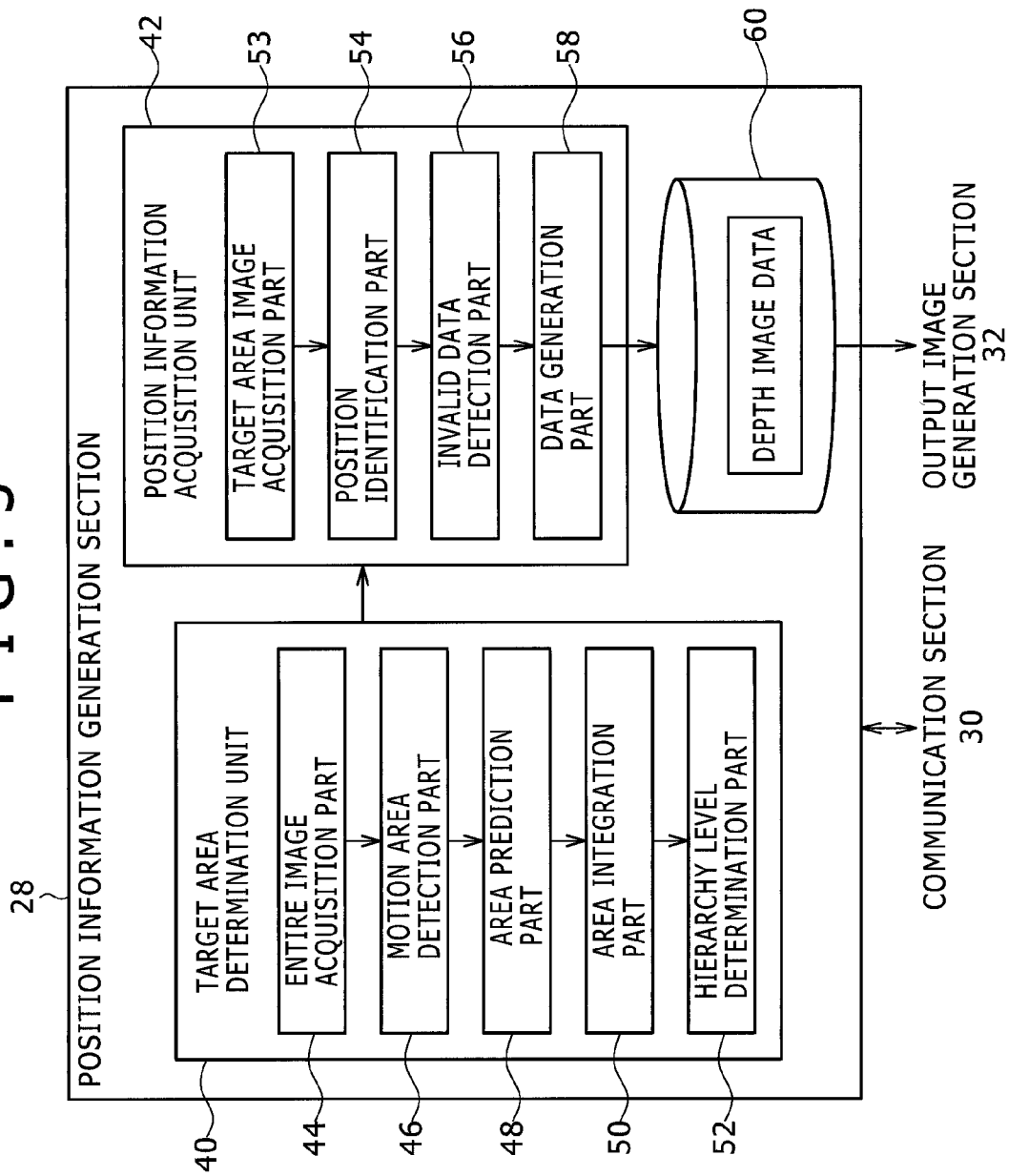
FIG. 5 is a diagram illustrating in detail the configuration of a position information generation section of the information processor in the present embodiment.

FIG. 5 illustrates in detail the configuration of the position information generation section 28 of the information processor 14. The position information generation section 28 includes a target area determination unit 40 which determines a target area and hierarchy level used for stereo matching, and position information acquisition unit 42 which performs stereo matching, thus acquiring position information of a subject. The target area determination unit 40 includes an entire image acquisition part 44, motion area detection part 46, area prediction part 48, area integration part 50 and hierarchy level determination part 52.

The entire image acquisition part 44 acquires, of the hierarchy data of stereo images generated by the first and second cameras 22 and 24 of the imaging device 12, the images of all the areas at the zeroth hierarchy level, the level having the lowest resolution, at a predetermined rate. The images acquired here may be only Y images. It should be noted, however, that the hierarchy level and type of images used may be selected as appropriate according, for example, to the processing capability and communication speed.

The motion area detection part 46 detects a motion area for each of the stereo images acquired by the entire image acquisition part 44. For example, if the subject is a person, the motion area detection part 46 detects the face first, estimating an area where the person's figure is likely to be located. Then, the motion area detection part 46 acquires a difference image of the estimated area from the image used in the previous time step, thus detecting, for example, an area with a difference greater than a predetermined threshold or an area circumscribed to that area as a motion area.

The area prediction part 48 predicts a target area to be searched during a future stereo matching process based on the motion area detected by the motion area detection part 46 for each of the stereo images. The area integration part 50 integrates the target areas of the stereo images predicted by the area prediction part 48 in a unified coordinate system, thus determining a single target area for each time. The hierarchy level determination part 52 selects, based on the size of the target area, a hierarchy level that permits stereo matching with high accuracy and whose resolution is not uselessly high.

The position information acquisition unit 42 includes a target area image acquisition part 53, position identification part 54, invalid data detection part 56 and data generation part 58. The target area image acquisition part 53 specifies the target area and hierarchy level determined by the target area determination unit 40, thus acquiring stereo image data from the imaging device 12. The position identification part 54 performs stereo matching on the stereo image acquired by the target area image acquisition part 53, thus identifying three-dimensional position information including the position in the depth direction.

Any of a variety of approaches proposed to date may be used for the stereo matching process performed here. For example, the image correlation method can be used. With this method, corresponding points are acquired first by defining a correlation window for one of the left and right images and calculating a cross-correlation coefficient with the correlation window image while moving a search window of the other image. Then, three-dimensional position information is found by applying the principle of triangulation based on the parallax between the corresponding points.

The invalid data detection part 56 identifies, of the position information identified by the position identification part 54, data to be invalidated. As described above, the more rearward the subject, the smaller the parallax. Therefore, the calculated position in the depth direction has a large error in the case of an image with low resolution. That is, the range in the depth direction that permits proper calculation varies depending on the resolution of the image used for stereo matching. As a result, the lower the resolution, the more forward the limit thereof.

For this reason, the invalid data detection part 56 defines a limit for data to be valid in advance as a depth limit in the depth direction for each of the hierarchy levels. Then, the invalid data detection part 56 compares this limit against the position in the depth direction identified by the position identification part 54, thus identifying invalid data. Doing so prevents a faulty condition, i.e., use of data obtained when the imaging device 12 shakes or when an object other than the subject whose motion is to be followed makes a large motion at the back for the processes at the subsequent stages.

The data generation part 58 creates depth images based on position information resulting from eliminating invalid data that has been identified by the invalid data detection part 56. The depth images have, as described above, a hierarchy structure having resolutions associated with a plurality of resolutions generated by the imaging device 12. All the pixel values of hierarchy data of the depth images are assigned an initial value such as "0" in advance and stored in a depth image data storage unit 60.

Then, every time the position identification part 54 identifies the position of the subject, the pixel at the hierarchy level and position associated with those of the captured image used for stereo matching is regarded as a coordinate in the depth direction, thus updating the depth image. As a result, the depth image data is updated at the same rate as for stereo matching process. The output information generation section 32 of the information processor 14 selects a hierarchy level from among those of the depth image data according to the spatial resolution required for the process performed by the output information generation section 32, reading position information and using the information as appropriate.

Figure 6:
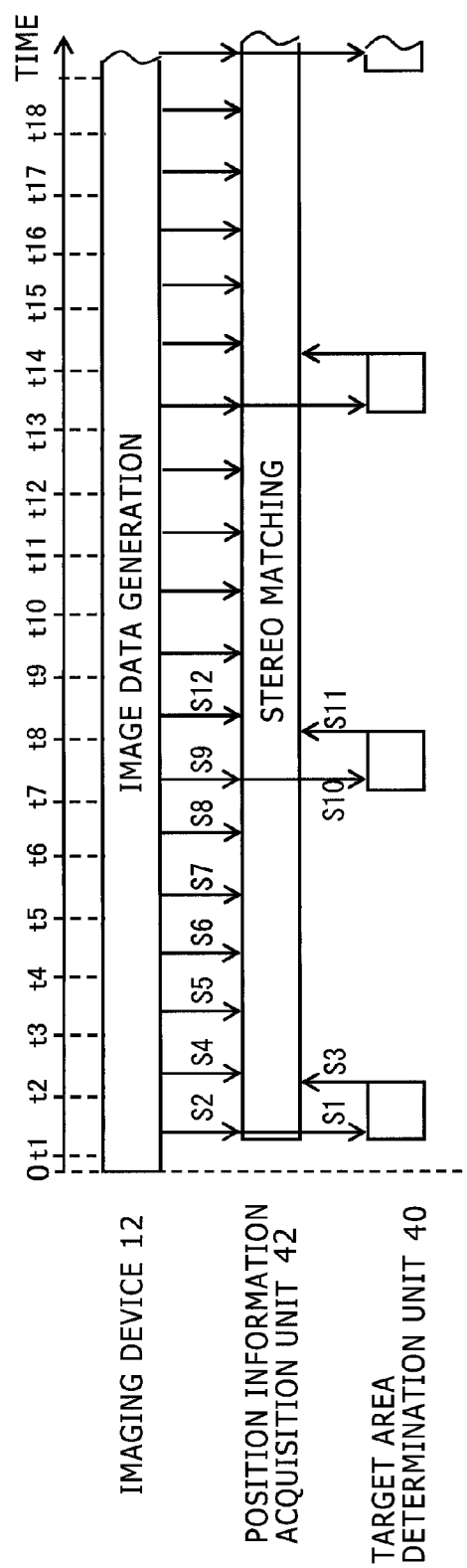
FIG. 6 is a diagram schematically illustrating the time relationship between the processes performed by the imaging device, a position information acquisition unit and target area determination unit in the present embodiment.

FIG. 6 schematically illustrates the time relationship between the processes performed by the imaging device 12, position information acquisition unit 42 and target area determination unit 40, with the horizontal direction representing the time axis. When all the processes begin at time 0, the imaging device 12 captures the subject at a predetermined frame rate at times t1, t2, t3 and so on to t18, generating image data having a plurality of resolutions and transmitting necessary data to the information processor 14. Although, in FIG. 6, the image data generation process performed by the imaging device 12 is represented by a series of rectangles that spread over the entire period of time, there may be actually a wait time after the completion of generation of data of the images captured at capture times and data transmission until a next capture time. The same holds true for the process performed by the position information acquisition unit 42.

Of the images captured at time t1, the first capture, the entire image with low resolution is supplied to the target area determination unit 40 of the information processor 14 (S1). At this time, the entire image of a predetermined hierarchy level is also supplied to the position information acquisition unit 42 (S2). The hierarchy level used at this time has a low resolution to the extent of providing sufficiently high stereo matching accuracy assuming that the subject is located at a standard position. This hierarchy level is specified in advance. The lower the resolution of the image, the smaller the size thereof. This permits efficient search of corresponding points.

The position information acquisition unit 42 performs stereo matching, elimination of invalid data and updating of the depth image in sequence using the stereo image supplied in S2. This allows position information of the subject associated with time t1 to be output in the format of a depth image having a hierarchy structure. On the other hand, the target area determination unit 40 performs motion area detection, area prediction, area integration and hierarchy level determination in sequence using the stereo image supplied in S1. The target area determination unit 40 notifies information about the target area and hierarchy level thus determined to the position information acquisition unit 42 (S3).

Information about the target area and hierarchy level determined at this time is for the images captured at times t2, t3, t4, t5, t6 and t7. Therefore, the area prediction part 48 of the target area determination unit 40 estimates a range of motion of the subject from the current motion area and predicts a target area for each time in such a manner as to enclose the range of motion in consideration of the amount of time available before each time. The position information acquisition unit 42 acquires, based on the information notified in S3, the stereo image data of the target area and hierarchy level determined in association with each of times t2, t3, t4, t5, t6 and t7 every time data of the image captured at each of these times is generated (S4, S5, S6, S7, S8 and S9).

The entire image having the lowest resolution of all the images captured at time t7 is supplied to the target area determination unit 40 at the same timing as S9 (S10). The target area determination unit 40 performs motion area detection, area prediction, area integration and hierarchy level determination in sequence again, notifying information about the determined target area and hierarchy level to the position information acquisition unit 42 (S11). Information about the target area and hierarchy level determined at this time is for the images captured at times t8, t9, t10, t11, t12 and t13.

From here onwards, as the same processes are repeated, position information about the subject in the images captured at each time is output as a depth image. It should be noted that although, in the same drawing, position information is acquired for all the frames captured by the imaging device 12, time intervals between the processes may be extended according to the time resolution required of position information in the process performed at the subsequent stage by the output information generation section 32 or processing capability of the information processing system 10 as described above. For example, the processes may be performed at the same rate as those performed by the target area determination unit 40.

Figure 7:
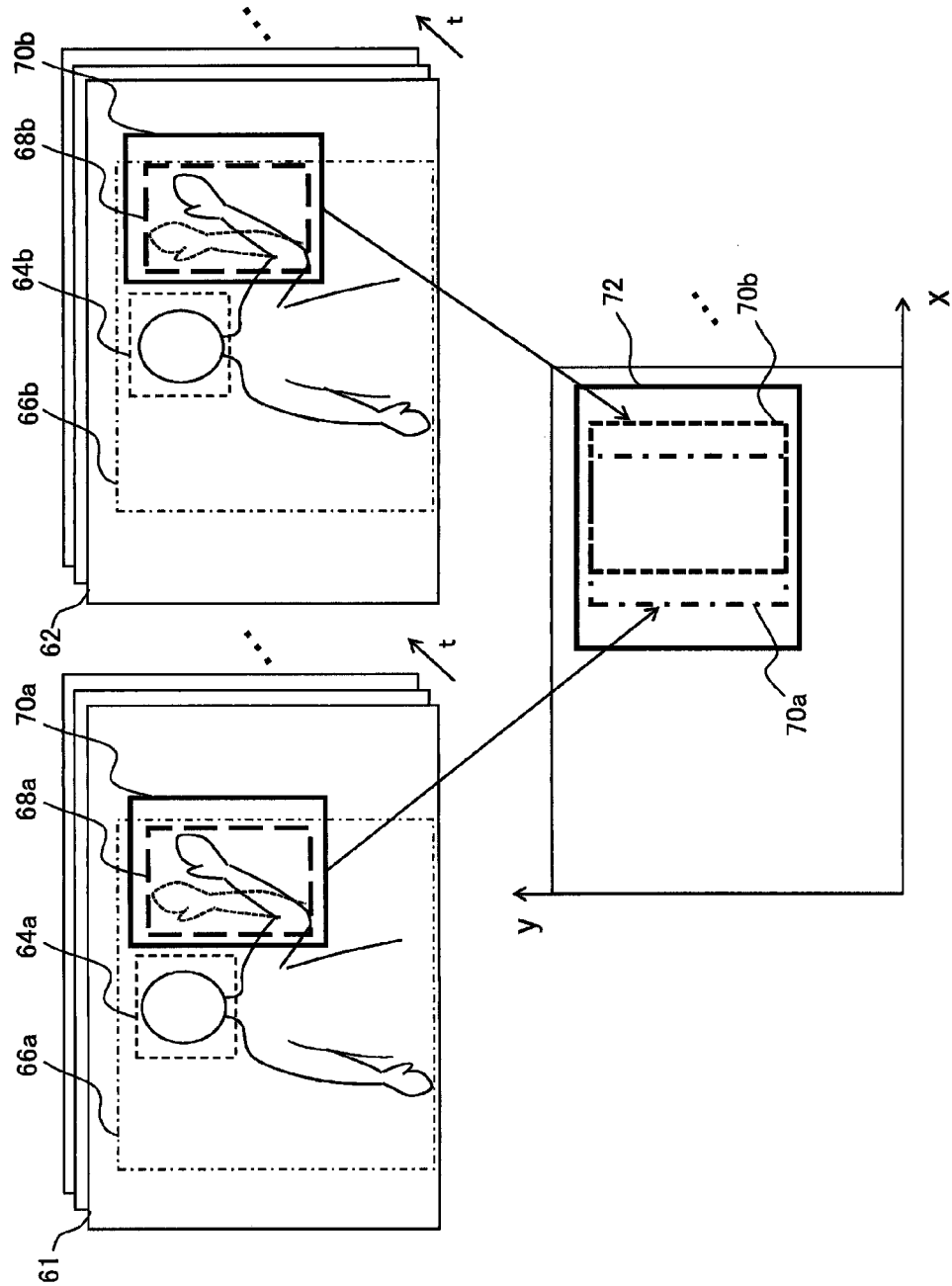
FIG. 7 is a diagram schematically illustrating how a motion area detection part, area prediction part and area integration part of the information processor proceed with their processes in the present embodiment.

FIG. 7 schematically illustrates how the motion area detection part 46, area prediction part 48 and area integration part 50 of the information processor 14 proceed with their processes. An image 61 is captured by the first camera 22 and an image 62 by the second camera 24. Because each of the cameras performs capture at a predetermined rate relative to time t, a string of images is generated relative to time t as illustrated in the same drawing. In this example, the images 61 and 62 at a given time depict a person as indicated by a solid line in the same drawing.

Because the first and second cameras 22 and 24 capture the person from different viewpoints arranged side by side, there is horizontal parallax in the person's figure between the images 61 and 62. The target area determination unit 40 finds a target area using the stereo image captured at left and right viewpoints as described above. First, the motion area detection part 46 determines a motion area independently for each of the images 61 and 62.

More specifically, if the subject is a person, the motion area detection part 46 performs a face detection process first, thus detecting a face area 64a in the image 61 and a face area 64b in the image 62. Any of a variety of common approaches such as pattern matching may be used for the face detection process. Even if the subject is not a person, as long as the shape is known, and template images are available, the same process can be performed. For example, even if the subject is, for example, a hand or a marker held by the user, i.e., the subject, the same process can be performed if template images representing the shape thereof are prepared in a memory or the like in advance.

Next, the motion area detection part 46 determines, as motion detection target areas 66a and 66b, areas highly likely to be motion areas in the images 61 and 62, respectively, based on the sizes and positions of the face areas 64a and 64b. The term "area highly likely to be motion areas" refers to a range within reach of a person's body, and the prediction thereof is easy as long as the face position is known. For example, a standard image is prepared in advance which shows the outline of a standard face and the range of a motion detection target area to be defined for that face by a rectangle. Then, the standard image is scaled up or down so that the outline of the standard face roughly overlaps those of the face areas 64a and 64b obtained by the face detection process. The rectangle of the standard image used at this time serves as motion detection target areas 66a and 66b.

Next, the motion area detection part 46 acquires difference images, each between corresponding areas of the entire image acquired by the previous target area determination process respectively for the left images and right images for the motion detection target areas 66a and 66b. Then, the motion area detection part 46 extracts spots where the difference is greater than the threshold. In the same drawing, the left hand depicted in the previously acquired entire image is shown by a dotted line in the images 61 and 62. Assuming that there is no change in other portions, the difference appears only on the left hand portion. As described above, the motion area detection part 46 extracts spots where the difference is greater than the threshold, determining rectangles circumscribed to these spots as motion areas 68a and 68b.

Next, the area prediction part 48 performs area prediction, bearing in mind capture time of the image subject to stereo matching based on the motion areas 68a and 68b determined respectively in the images 61 and 62. This process may be performed by vertically and horizontally enlarging the motion areas 68a and 68b at the same ratio simply using a quantity proportional to the elapse of time. Alternatively, this process may be performed by predicting the direction of travel of the subject from the plurality of images acquired during the target area determination process performed earlier than the previous such process based, for example, on an autoregressive model first and then enlarging the motion areas 68a and 68b only in this direction. Still alternatively, this process may be performed by using the above in combination.

Predicted areas 70a and 70b are determined respectively in the images 61 and 62 as described above. It should be noted that although, in the same drawing, only one predicted area is shown in each of the images, a predicted image is determined relative to each time at which an image subject to stereo matching is captured as described earlier. Next, the area integration part 50 superimposes the predicted areas 70a and 70b, each determined for one of the left and right images, one on the other in a normalized coordinate system that makes up the image plane, integrating the two areas by finding an area that constitutes the sum of the two areas (an area that is included in at least one of the two areas).

There is horizontal parallax between images captured from left and right or different viewpoints. Therefore, the predicted areas 70a and 70b deviate in the x direction (horizontal direction) of the coordinate system making up the image plane as shown in the same drawing. A target area is determined from two images as described above for the following reason. That is, the more forward the subject, the larger the figure thereof apparently looks, and therefore, the greater the range within reach by motion, thus resulting in a higher likelihood that the predicted areas determined as described above may be exceeded.

For this reason, parallax is used to adjust the size of the target area according to the magnitude of change in apparent motion that depends on the position of the subject in the depth direction. Large parallax leads to large deviations of the predicted areas 70a and 70b. As a result, the summed area is large. On the other hand, small parallax leads to small deviations of the predicted areas 70a and 70b. As a result, the summed area is not very large. As described above, the size of the area is adjusted in consideration of the position of the subject in the depth direction, thus excluding redundant area while at the same time preventing the subject from lying outside the target area.

It should be noted that the area integration part 50 further determines an area, obtained by enlarging the summed area vertically and horizontally at a predetermined magnification factor, as a final target area 72. Doing so provides further reduced likelihood of the subject lying outside the target area.

Figure 8:
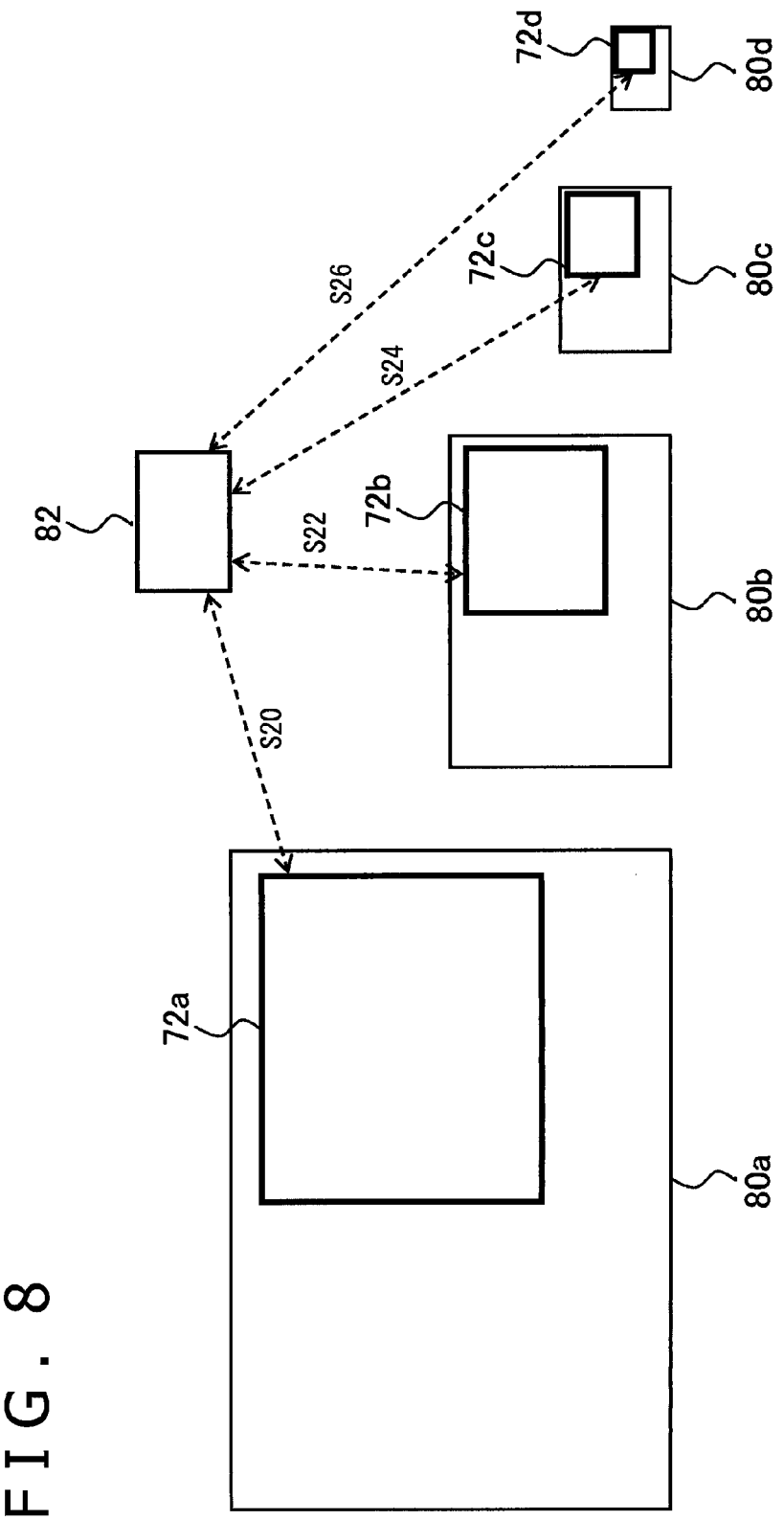
FIG. 8 is a diagram schematically illustrating how a hierarchy level determination part selects a hierarchy level used for stereo matching based on the size of a target area in the present embodiment.

FIG. 8 schematically illustrates how the hierarchy level determination part 52 selects a hierarchy level used for stereo matching based on the size of a target area. In the same drawing, rectangles 80a, 80b, 80c and 80d represents, of the hierarchy levels of the captured images, the image sizes at the third, second, first and zeroth hierarchy levels. The size of the target area 72 determined in the normalized coordinate system of the images in FIG. 7 is as shown by rectangles 72a, 72b, 72c and 72d for the respective image sizes.

The rectangles 72a, 72b, 72c and 72d, acquired by changing the size of the target area 72 in association with the image sizes at the respective hierarchy levels, are compared against a standard size rectangle 82, thus selecting a hierarchy level that provides a target area size close to the standard size rectangle 82. The standard size rectangle 82 prescribes the apparent size of the subject required to achieve a suitable accuracy during stereo matching and is specified in advance, for example, by experiment.

As to whether the size is large or small, when two rectangles have a containment relationship, the rectangle contained in the other may be considered as "small." Alternatively, the two rectangles may be compared in terms of area. Still alternatively, they may be compared in terms of the length of a vertical or horizontal side. In selecting a hierarchy level, on the other hand, of the rectangles 72a, 72b, 72c and 72d associated with the different hierarchy levels, either of the two rectangles, one immediately smaller than and the other immediately larger than the standard size rectangle 82 in permutations of sizes, may be selected. The rectangle to be selected need not necessarily be sized closest to the standard size rectangle 82.

In the case of FIG. 8, for example, the standard size rectangle 82 is sized between the rectangles 72b and 72c of the rectangles 72a, 72b, 72c and 72d. Therefore, the second hierarchy level associated with the rectangle 72b or the first hierarchy level associated with the rectangle 72c is selected. For example, the comparison may be performed starting from the rectangle 72a at the third hierarchy level, the largest rectangle of all, in descending order of size (in the order from S20, to S22, to S24, and to S26) so that the hierarchy level associated with the rectangle contained in the standard size rectangle 82 is first selected. In the example shown in the drawing, the first hierarchy level associated with the rectangle 72c is selected.

Such a procedure makes it possible to select, of the hierarchy levels that provide rectangles close to the standard size rectangle, the hierarchy level having lower resolution, thus keeping the amount of calculations to an even lower level. In any case, selecting a hierarchy level that provides a target area sized closer to the standard size rectangle 82 allows for adjustment of the resolution of the image used for stereo matching according to the apparent size of the subject as described above. This maintains the accuracy while at the same time preventing useless search for more-than-necessary detailed image data.

Figure 9:
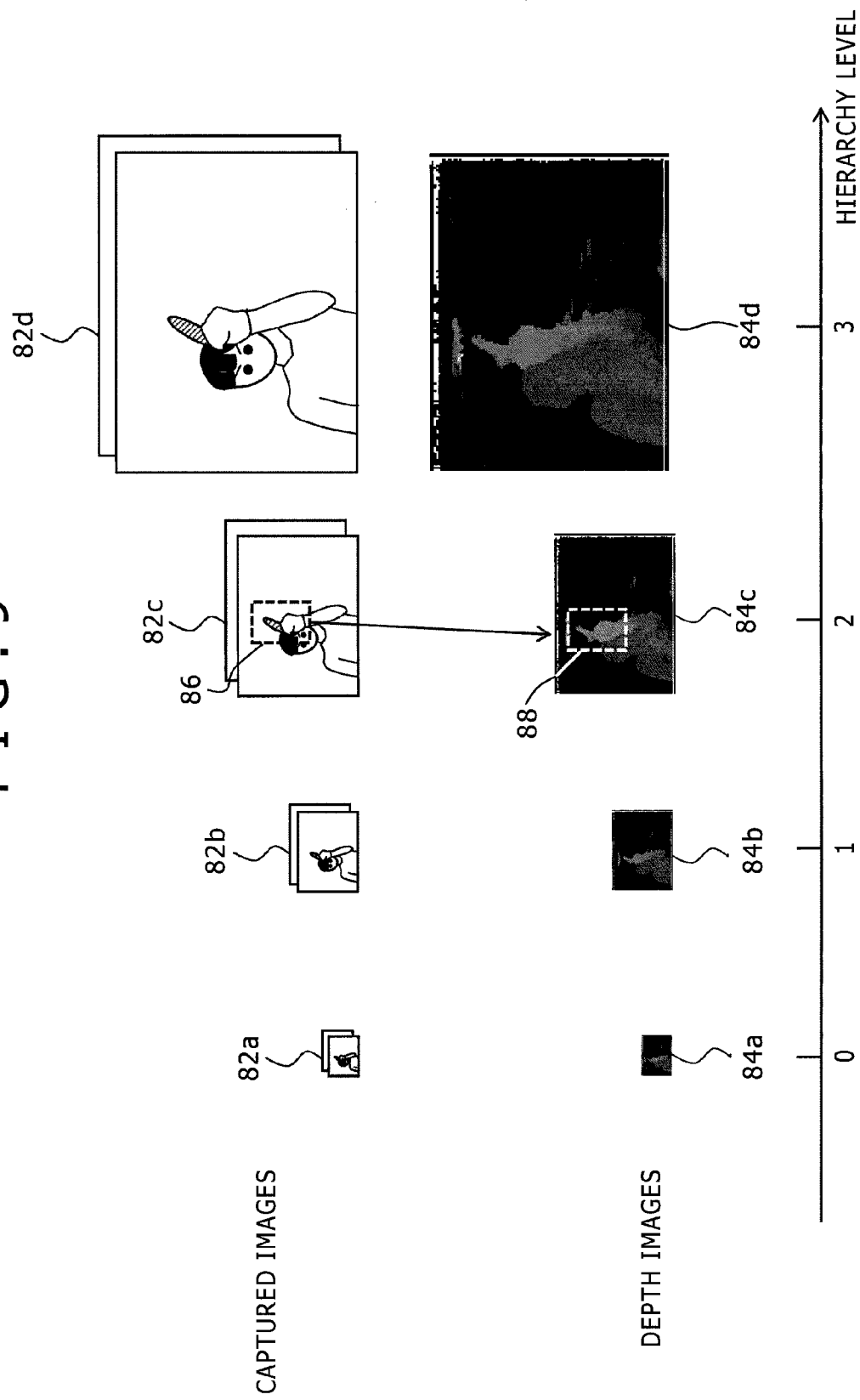
FIG. 9 is a diagram illustrating the association between hierarchy levels of captured images generated by the imaging device and those of depth images generated by a data generation part of the position information acquisition unit in the present embodiment.

FIG. 9 illustrates the association between hierarchy levels of captured images generated by the imaging device 12 and those of depth images generated by the data generation part 58 of the position information acquisition unit 42. In the same drawing, four sets of images 82a, 82b, 82c and 82d at the top are stereo images captured at a certain time, and four images 84a, 84b, 84c and 84d at the bottom are depth images generated for the stereo images. Both of these images are respectively images at the zeroth, first, second and third hierarchy levels.

For example, if a person is captured swinging a rodlike object in front of his or her face, captured images such as the images 82a, 82b, 82c or 82d are generated one for each viewpoint at a certain time. Assuming that the target area determination unit 40 determines the second hierarchy level as a hierarchy level and the area 86 as a target area for such captured images, the position information acquisition unit 42 acquires the left and right image data of the hierarchy level and area to proceed with stereo matching.

Then, when position information about the subject in the area is acquired, the position information acquisition unit 42 updates, of the hierarchy data of the depth images, the pixel values of the associated area, i.e., the area 88, at the associated hierarchy level. At this time, if the smallest value (frontmost position) of all the position coordinates in the depth direction acquired for the area 86 is more rearward than the depth limit defined for the second hierarchy level, the updating process is not performed. This is intended to exclude, as an error, a large motion resulting from a cause of some kind at a position in the depth direction which cannot be, under a normal condition, obtained accurately with the resolution as a position of the subject. The hierarchy levels and depth limits are associated with each other in advance and stored in a memory as a table.

As described above, depth images are organized into a hierarchy structure, and hierarchy data associated with the hierarchy level of the captured image used for stereo matching is updated at each time. The resolution of an image is associated with the range of position of the subject in the depth direction acquired with high accuracy from the image. Therefore, as depth images are organized into a hierarchy structure for each of the resolutions of the images used for stereo matching, and acquired position information is reflected only in the associated hierarchy level, the subject positions are classified by range of position in the depth direction.

The output information generation section 32 adapted to perform its processes using the depth images can prevent a reduction in processing accuracy and processing speed resulting from including redundant data in the processes while at the same time reliably acquiring necessary information by appropriately selecting and referencing a hierarchy level of the depth images according to the nature of the process performed and the required accuracy.

For example, when ignoring the motion of a subject far away from the cameras, the output information generation section 32 references only the images having low resolution such as those at the zeroth and first hierarchy levels. Conversely, when focusing attention on the motion of only a subject at the rear, the output information generation section 32 references only the images having high resolution such as those at the second and third hierarchy levels. When acquiring all motions in a wide range from the front to rear, the output information generation section 32 may reference the zeroth to third hierarchy levels one after another. The hierarchy level of the depth images to be referenced may be defined relative, for example, to the nature of process, and the estimated position and size of the subject through verification by actually performing the process.

In the present embodiment described above, the imaging device has two cameras to capture a movie of the subject from different viewpoints at the same time. The captured images are converted into a plurality of hierarchy images having different resolutions by a pyramid filter. This is followed by the detection of a motion area using an entire image having low resolution, and the selection of a hierarchy level suitable for the size thereof, after which only a target area where the subject is predicted to move is acquired for stereo matching.

As a result, it is possible to omit useless data processing to the extent of maintaining the accuracy of stereo matching irrespective of where the subject is located in the depth direction, thus striking a balance between accuracy and processing efficiency. Further, even if the position of the subject changes, the image size of the target area does not change significantly. As a result, the amount of calculations remains independent of the target position, thus permitting stable position information output.

Further, the process adapted to determine a target area by predicting a future target area based, for example, on motion of the subject is performed at a separate timing from stereo matching. This makes it possible to determine at will the frequency at which each of these two processes will be performed in consideration of processing resources, processing capability, required responsiveness and accuracy.

Further, determination of a target area is performed using two stereo images captured by two cameras and the target area is determined based on the summed area of the motion areas obtained from the two images. This provides a larger target area for a forward subject whose range covered by motion is large, thus making it less likely that the subject may lie outside the target area. On the other hand, the target area of a rearward subject which is originally unlikely to lie outside the target area can be prevented from expanding, thus ensuring that a redundant area is included in the target area less frequently.

Further, acquired position information has a hierarchy structure representing, with a plurality of resolutions, depth images having positions in the depth direction as pixel values. Then, the pixel values of the area at the hierarchy level associated with the image used for stereo matching are updated at each time. This makes it possible to change the hierarchy level to reference according, for example, to the accuracy required of the process performed at the subsequent stage using position information, resolution, and estimated range of position of the subject in the depth direction, thus ensuring higher efficiency in the reference process and the processes performed using referenced information.

Thus, the present invention has been described based on the embodiment thereof. The above embodiment is illustrative, it is understood by those skilled in the art that the combination of the components and processes can be modified in various ways, and that these modification examples are also within the scope of the present invention.

In the present embodiment, for example, stereo matching is performed on the target area determined by the target area determination unit 40, thus acquiring three-dimensional position information of the subject. However, the technique for determining a target area is applicable to processes other than stereo matching. Such a process may be a facial expression recognition process that does not require detailed position information in the depth direction. In this case, it is also possible to select an image with optimal resolution by adjusting the size of the target area depending on the face position in the depth direction using stereo images, thus striking a balance between accuracy and efficiency for the subsequent processes.

Figure 10:
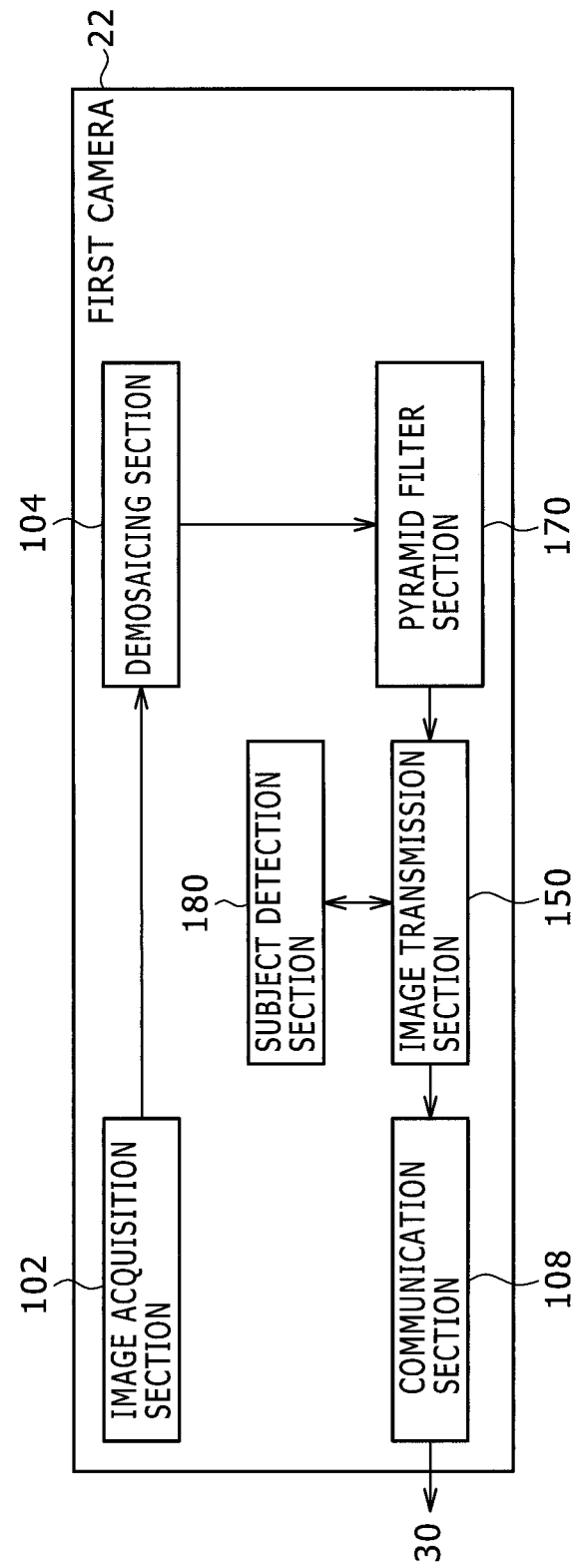
FIG. 10 is a diagram illustrating in detail the configuration of the first camera in a modification example of the present embodiment.

Further, in the present embodiment, the motion area detection part 46 of the information processor 14 performs the face detection process as an initial process adapted to identify an area with motion, i.e., a target area. On the other hand, this face detection process functionality may be provided in each of the cameras of the imaging device 12. FIG. 10 illustrates the configuration of the first camera 22 in such a case. Here, the image acquisition section 102, demosaicing section 104, image transmission section 150, pyramid filter section 170 and communication section 108 included in the first camera 22 are the same as the respective functional blocks shown in FIG. 3. In this modification example, the first camera 22 further includes a subject detection section 180. The second camera 24 has the same configuration.

The subject detection section 180 acquires an image to be processed by the target area determination unit 40 of the information processor 14 such as an image of all areas at the zeroth hierarchy level with the lowest resolution from the block read part 156 of the image transmission section 150, performing the face detection process on the image and identifying the face area. Then, the subject detection section 180 notifies information about the position and size of the area to the packetizing unit 160 of the image transmission section 150 where this information is packetized together with image data itself to be detected and transmitted to the information processor 14. Alternatively, this information is associated with identification information of the image to be detected and transmitted to the information processor 14 from the communication section 108.

In this case, the motion area detection part 46 of the information processor 14 can skip the detection of the face areas 64a and 64b shown in FIG. 7 by acquiring information about the face area in the image at each time together with the image data from the imaging device 12. At this time, the motion area detection part 46 begins by determining the motion detection target areas 66a and 66b. Changing the share of processing load according to the processing capability of the imaging device 12 as described above ensures high efficiency in the identification of a target area, thus allowing generation of position information with high responsiveness and accuracy.

Here, the detection process handled by the subject detection section 180 may be applied not only to a human face but also to a hand, marker, predetermined object and so on by preparing appropriate template images using an existing template matching technique as described above. For example, in the information processor 14, the input information acquisition section 26 identifies an associated subject according, for example, to a game title or type of information processing specified by the user to begin, notifying identification information to the imaging device 12.

Each of the cameras of the imaging device 12 reads a template image associated with the notified subject from a plurality of template images available in a memory which is not shown and performs template matching, thus detecting the subject. Alternatively, the information processor 14 may transmit template image data itself to the imaging device 12. This makes it possible to change the subject in various ways according, for example, to the user's instruction input.

REFERENCE SIGNS LIST

10 Information processing system, 12 Imaging device, 14 Information processor, 16 Display device, 22 First camera, 24 Second camera, 26 Input information acquisition section, 28 Position information generation section, 30 Communication section, 32 Output information generation section, 40 Target area determination unit, 42 Position information acquisition unit, 44 Entire image acquisition part, 46 Motion area detection part, 48 Area prediction part, 50 Area integration part, 52 Hierarchy level determination part, 53 Target area image acquisition part, 54 Position identification part, 56 Invalid data detection part, 58 Data generation part, 60 Depth image data storage unit, 102 Image acquisition section, 104 Demosaicing section, 108 Communication section, 150 Image transmission section, 151 Block selection unit, 164 Control unit, 170 Pyramid filter section, 180 Subject detection section.

INDUSTRIAL APPLICABILITY

As described above, the present invention is applicable to information processors of computers, cameras, gaming machines, image display devices and so on.

The invention claimed is:

1. An information processor for outputting, at a predetermined rate, position information of a subject, comprising:
a communications unit adapted to receive image data from a stereo movie, the stereo movie including a sequence of stereo image frames, each stereo image frame including first image data and second image data taken at a respective time in the sequence, the first image data including a first image frame captured along a first line of sight of a scene containing the subject, and saved at a plurality of hierarchical image resolutions, the second image data including a second image frame captured along a second line of sight of the scene, and saved at a plurality of hierarchical image resolutions;
a motion area identification unit adapted to acquire the first image frame and the second image frame at a predetermined one of the plurality of hierarchical image resolutions and at each of time t(i) and time t(i+1), and to identify: (a) a first motion area by computing a difference between the first image frame at time t(i) and the first image frame at time t(i+1), and (b) a second motion area by computing a difference between the second image frame at time t(i) and the second image frame at time t(i+1);
a target area determination unit adapted to determine a first target area by expanding a boundary of the first motion area, a second target area by expanding a boundary of the second motion area, and a final target area by aggregating the first and second target areas using superposition, such that the final target area is larger than either of the first and second target areas alone;
a resolution determination unit adapted to: (i) convert a size of the final target area at the predetermined one of the plurality of hierarchical image resolutions into a respective size of the final target area at each of the plurality of hierarchical image resolutions, and (ii) select one of the plurality of hierarchical image resolutions at which the size of the final target area at such resolution meets a criteria of comparison with a size of a predetermined reference area;
a position information acquisition unit adapted to compute three-dimensional position information of the subject within the scene by performing stereo matching between respective areas, each defined by the final target area, of the first image frame and the second image frame at the selected one of the plurality of hierarchical image resolutions and at time t(i); and
an output unit adapted to output the position information in order to manipulate a computer-generated display for a user.

2. The information processor of claim 1, wherein the position information acquisition unit employs the final target area and the selected one of the plurality of hierarchical image resolutions to compute a sequence of three-dimensional position information of the subject within subsequent first and second image frames at subsequent times t(i), i=1, 2, . . . j.

3. The information processor of claim 2, wherein:
at time t(j), the motion area identification unit operates to update the first and second motion areas, the target area determination unit operates to update the first and second target areas and the final target area, and the resolution determination unit operates to update the selected one of the plurality of hierarchical image resolutions;
the position information acquisition unit employs the updated final target area and the updated selected one of the plurality of hierarchical image resolutions to compute respective three-dimensional position information of the subject within subsequent first and second image frames at times t(j+i), i=1, 2, . . . j; and
the motion area identification unit, the target area determination unit, and the resolution determination unit operate to further update the first and second motion areas, first and second target areas, final target area, and selected one of the plurality of hierarchical image resolutions for subsequent times.

4. The information processor of claim 1, wherein the criteria of comparison is such that the selected one of the plurality of hierarchical image resolutions is one at which the size of the final target area at such resolution is less than or equal to the size of a predetermined reference area.

5. The information processor of claim 1, wherein the motion area identification unit is adapted to identify:
(i) the first motion area by computing a difference between a first motion detection target area within the first image frame at time t(i), and a first motion detection target area within the first image frame at time t(i+1); and
(ii) the second motion area by computing a difference between a second motion detection target area within the second image frame at time t(i), and a second motion detection target area within the second image frame at time t(i+1), wherein sizes of the first motion detection target area and the second motion detection target area are based on detection of one or more features within the scene.

6. The information processor of claim 1, wherein the position information acquisition unit is further adapted to update a depth image at time t(i) containing pixel values based on portions of the first and second image frames defined by the final target area region at the selected one of the plurality of hierarchical image resolutions.

7. An imaging device, comprising:
a pair of cameras adapted to capture a stereo movie, the stereo movie including a sequence of stereo image frames, each stereo image frame including first image data and second image data taken at a respective time in the sequence, the first image data including a first image frame captured along a first line of sight of a scene containing the subject, and saved at a plurality of hierarchical image resolutions, the second image data including a second image frame captured along a second line of sight of the scene, and saved at a plurality of hierarchical image resolutions, wherein each of the cameras includes:
an image acquisition section adapted to acquire an unprocessed image captured using an imaging element,
a demosaicing section adapted to perform a de-mosaic process on the unprocessed image,
a filter section adapted to gradually downsize the demosaiced image to produce the plurality of hierarchical image resolutions, and
an image transmission section adapted to: (i) receive, from a connected information processor, an image data transfer request specifying a selected one of the plurality of hierarchical image resolutions and corresponding a final target area at such selected resolution, (ii) extract image data from the first image frame and the second image frame defined by the final target area and at the selected one of the plurality of hierarchical image resolutions, and (iii) transfer the image data to the information processor,
wherein the image data transfer request is produced in accordance with a process comprising:
acquiring the first image frame and the second image frame at a predetermined one of the plurality of hierarchical image resolutions and at each of time t(i) and time t(i+1), and identifying: (a) a first motion area by computing a difference between the first image frame at time t(i) and the first image frame at time t(i+1), and (b) a second motion area by computing a difference between the second image frame at time t(i) and the second image frame at time t(i+1);
determining a first target area by expanding a boundary of the first motion area, a second target area by expanding a boundary of the second motion area, and a final target area by aggregating the first and second target areas using superposition, such that the final target area is larger than either of the first and second target areas alone; and
converting a size of the final target area at the predetermined one of the plurality of hierarchical image resolutions into a respective size of the final target area at each of the plurality of hierarchical image resolutions, and selecting the one of the plurality of hierarchical image resolutions at which the size of the final target area at such resolution meets a criteria of comparison with a size of a predetermined reference area.

8. The imaging device of claim 7, wherein
each of the cameras further includes a subject detection section adapted to perform a detection process of the subject within at least one of the first and second image frames, and to identify a position and size of a motion detection target area of the subject within the at least one of the first and second image frames, and
the image transmission section transfers information about the position and size of the motion detection target area to the information processor together with the image data.

9. The imaging device of claim 8, wherein the subject detection section detects the subject by performing template matching between a template image associated with the subject specified by the information processor and an image subject to a detection process.

10. An information processing system, comprising:
an imaging device including a pair of cameras adapted to capture a stereo movie, the stereo movie including a sequence of stereo image frames, each stereo image frame including first image data and second image data taken at a respective time in the sequence, the first image data including a first image frame captured along a first line of sight of a scene containing the subject, and saved at a plurality of hierarchical image resolutions, the second image data including a second image frame captured along a second line of sight of the scene, and saved at a plurality of hierarchical image resolutions; and
an information processor adapted to output, at a predetermined rate, position information of a subject within the scene,
wherein each of the cameras of the imaging device include:
an image acquisition section adapted to acquire an unprocessed image captured using an imaging element,
a demosaicing section adapted to perform a de-mosaic process on the unprocessed image,
a filter section adapted to gradually downsize the demosaiced image to produce the plurality of hierarchical image resolutions, and
an image transmission section adapted to: (i) receive, from the information processor, an image data transfer request specifying a selected one of the plurality of hierarchical image resolutions and corresponding a final target area at such selected resolution, (ii) extract image data from the first image frame and the second image frame defined by the final target area and at the selected one of the plurality of hierarchical image resolutions, and (iii) transfer the image data to the information processor, and
wherein the information processor includes: a motion area identification unit adapted to acquire the first image frame and the second image frame at a predetermined one of the plurality of hierarchical image resolutions and at each of time t(i) and time t(i+1), and to identify: (a) a first motion area by computing a difference between the first image frame at time t(i) and the first image frame at time t(i+1), and (b) a second motion area by computing a difference between the second image frame at time t(i) and the second image frame at time t(i+1);
a target area determination unit adapted to determine a first target area by expanding a boundary of the first motion area, a second target area by expanding a boundary of the second motion area, and the final target area by aggregating the first and second target areas using superposition, such that the final target area is larger than either of the first and second target areas alone;

a resolution determination unit adapted to: (i) convert a size of the final target area at the predetermined one of the plurality of hierarchical image resolutions into a respective size of the final target area at each of the plurality of hierarchical image resolutions, and (ii) select the one of the plurality of hierarchical image resolutions at which the size of the final target area at such resolution meets a criteria of comparison with a size of a predetermined reference area;

a position information acquisition unit adapted to compute three-dimensional position information of the subject within the scene by performing stereo matching between respective areas, each defined by the final target area, of the first image frame and the second image frame at the selected one of the plurality of hierarchical image resolutions and at time t(i) received as the extracted image data from the imaging device; and an output unit adapted to output the position information in order to manipulate a computer-generated display for a user.

11. An information processing method for outputting, at a predetermined rate, position information of a subject, comprising:

receiving image data from a stereo movie, the stereo movie including a sequence of stereo image frames, each stereo image frame including first image data and second image data taken at a respective time in the sequence, the first image data including a first image frame captured along a first line of sight of a scene containing the subject, and saved at a plurality of hierarchical image resolutions, the second image data including a second image frame captured along a second line of sight of the scene, and saved at a plurality of hierarchical image resolutions;

acquiring the first image frame and the second image frame at a predetermined one of the plurality of hierarchical image resolutions and at each of time t(i) and time t(i+1), and to identifying: (a) a first motion area by computing a difference between the first image frame at time t(i) and the first image frame at time t(i+1), and (b) a second motion area by computing a difference between the second image frame at time t(i) and the second image frame at time t(i+1);

determining a first target area by expanding a boundary of the first motion area, a second target area by expanding a boundary of the second motion area, and a final target area by aggregating the first and second target areas using superposition, such that the final target area is larger than either of the first and second target areas alone;

selecting one of the plurality of hierarchical image resolutions by: (i) converting a size of the final target area at the predetermined one of the plurality of hierarchical image resolutions into a respective size of the final target area at each of the plurality of hierarchical image resolutions, and (ii) selecting the one of the plurality of hierarchical image resolutions at which the size of the final target area at such resolution meets a criteria of comparison with a size of a predetermined reference area; and computing three-dimensional position information of the subject within the scene by performing stereo matching between respective areas, each defined by the final target area, of the first image frame and the second image frame at the selected one of the plurality of hierarchical image resolutions and at time t(i); and outputting the position information in order to manipulate a computer-generated display for a user.

12. A processing system executing a computer program for causing a computer to implement a functionality of outputting, at a predetermined rate, position information of a subject by carrying out actions, comprising:

receiving image data from a stereo movie, the stereo movie including a sequence of stereo image frames, each stereo image frame including first image data and second image data taken at a respective time in the sequence, the first image data including a first image frame captured along a first line of sight of a scene containing the subject, and saved at a plurality of hierarchical image resolutions, the second image data including a second image frame captured along a second line of sight of the scene, and saved at a plurality of hierarchical image resolutions;

acquiring the first image frame and the second image frame at a predetermined one of the plurality of hierarchical image resolutions and at each of time t(i) and time t(i+1), and to identifying: (a) a first motion area by computing a difference between the first image frame at time t(i) and the first image frame at time t(i+1), and (b) a second motion area by computing a difference between the second image frame at time t(i) and the second image frame at time t(i+1);

determining a first target area by expanding a boundary of the first motion area, a second target area by expanding a boundary of the second motion area, and a final target area by aggregating the first and second target areas using superposition, such that the final target area is larger than either of the first and second target areas alone;

selecting one of the plurality of hierarchical image resolutions by: (i) converting a size of the final target area at the predetermined one of the plurality of hierarchical image resolutions into a respective size of the final target area at each of the plurality of hierarchical image resolutions, and (ii) selecting the one of the plurality of hierarchical image resolutions at which the size of the final target area at such resolution meets a criteria of comparison with a size of a predetermined reference area; and computing three-dimensional position information of the subject within the scene by performing stereo matching between respective areas, each defined by the final target area, of the first image frame and the second image frame at the selected one of the plurality of hierarchical image resolutions and at time t(i); and outputting the position information in order to manipulate a computer-generated display for a user.

13. A non-transitory, computer readable storage medium storing a computer program for causing a computer to implement a functionality of outputting, at a predetermined rate, position information of a subject by carrying out actions, comprising:

receiving image data from a stereo movie, the stereo movie including a sequence of stereo image frames, each stereo image frame including first image data and second image data taken at a respective time in the sequence, the first image data including a first image frame captured along a first line of sight of a scene containing the subject, and saved at a plurality of hierarchical image resolutions, the second image data including a second image frame captured along a second line of sight of the scene, and saved at a plurality of hierarchical image resolutions;

acquiring the first image frame and the second image frame at a predetermined one of the plurality of hierarchical image resolutions and at each of time t(i) and time t(i+1), and to identifying: (a) a first motion area by computing a difference between the first image frame at time t(i) and the first image frame at time t(i+1), and (b) a second motion area by computing a difference between the second image frame at time t(i) and the second image frame at time t(i+1);

determining a first target area by expanding a boundary of the first motion area, a second target area by expanding a boundary of the second motion area, and a final target area by aggregating the first and second target areas using superposition, such that the final target area is larger than either of the first and second target areas alone;

selecting one of the plurality of hierarchical image resolutions by: (i) converting a size of the final target area at the predetermined one of the plurality of hierarchical image resolutions into a respective size of the final target area at each of the plurality of hierarchical image resolutions, and (ii) selecting the one of the plurality of hierarchical image resolutions at which the size of the final target area at such resolution meets a criteria of comparison with a size of a predetermined reference area; and computing three-dimensional position information of the subject within the scene by performing stereo matching between respective areas, each defined by the final target area, of the first image frame and the second image frame at the selected one of the plurality of hierarchical image resolutions and at time t(i); and outputting the position information in order to manipulate a computer-generated display for a user.

14. The An information processor of claim 1, wherein:

the first target area is expanded beyond the boundary of the first motion area to include at least some area containing no motion; and the second target area is expanded beyond the boundary of the second motion area to include at least some area without motion.

\* \* \* \* \*